to and mixed with the air-free concentrate. The concentrate may be otherwise standardized as to composition and density.

Since it is desirable to produce a finished product retaining its full proportion of ascorbic acid, and with no oxidation damage, the standardized product must be filled into cans with practical absence of air. This is best accomplished by heating the milk to a temperature near the normal boiling point, in a closed passage heater, as it flows to the filling machine. Cans are closed immediately in a steam atmosphere. In commercial practice, the filled, sealed cans pass immediately from the sealer to the inlet of a rotary pressure sterilizer. The sterilization is carried somewhat beyond the point, as to time and temperature, required for sterilization and to that point where additional adsorption of casein upon the particles of metallic dispersion begins to take place. Microscopic examination will show the beginning of clumping of the colloidal particles, the clumped particles being within the range of microscopic visibility. This produces an improved degree of physical stabilization.

The finished product possesses characteristics which distinguish it from any canned milk or other form of milk heretofore known. The presence of dietary sufficiencies of both copper (or iron, or manganese, or combinations thereof) and ascorbic acid, in the same product, is believed to be unique. The canned product will show, upon analysis, copper in proportion exceeding 1 mg. per liter of fresh milk equivalent, together with ascorbic acid. The proportion of ascorbic acid will remain unchanged over a prolonged period of time, six months and more.

The nutritional distinction from any other evaporated milk is marked. The product may be distinguished from any milk heretofore known by its nutritional effect when fed to young rats. If fed as the sole food to young rats, it will produce a rate and extent of growth approximately 70% greater than produced in rats (of equal age and weight) fed either natural milk or evaporated milk as heretofore made. For each 100 units of growth in rats fed natural milk or its equal, approximately 170 units will be found in the rats fed on the new product. The distinction is sufficiently marked to permit the use of this test to identify the new product.

Fresh milk, or pasteurized milk fortified in the same manner as above described for making evaporated milk but without concentration, will possess the same characteristics as the fortified evaporated milk. Fresh or pasteurized milk loses ascorbic acid appreciably within 48 hours if placed in bottles not vacuum sealed. If fortified with the above described encapsulated metallic colloid, it will be affected by contact with air at the same rate as it would have been affected without the fortification. This is a distinction from fresh milk heretofore fortified with the metallic constituents in active form, which milk has become rancid at an accelerated rate and has lost its ascorbic acid at an accelerated rate.

Instead of incorporating ascorbic acid in air-free fortifying material and mixing the product with air-free milk concentrate, I may mix the fortifying material in an un-deaerated condition with the milk concentrate in un-deaerated condition, deaerate the mixture, and then add the supplementary ascorbic acid.

I claim:

1. The process of producing a concentrated liquiform milk product containing ascorbic acid and fortified with at least one of the metals of the group consisting of copper, iron, and manganese, which comprises dispersing a water-insoluble caseinate of the metal into an assimilable protective colloid, causing the protective colloid to become adsorbed upon the dispersed particles of the metallic caseinate, incorporating the resulting dispersion into a liquiform milk product at any stage of its concentration, and canning and sterilizing the resulting product.

2. The process of fortifying milk, containing an oxidizable vitamin, with at least one of the metals of the group consisting of copper, iron and manganese, which comprises dispersing a water-insoluble caseinate of the metal in a colloidal dispersion of an assimilable protein with such dispersive power as to cause adsorption of the protein on the surfaces of the dispersed particles of the metal caseinate, and incorporating the resulting dispersion of organo-metallic complex into milk.

3. The process of producing an evaporated milk product fortified with at least one of the metals of the group consisting of copper, iron, and manganese, and containing an oxidizable vitamin, which comprises concentrating whole milk, admixing with the cooled concentrated milk a dispersion, in a liquiform dispersion of an assimilable protein, of near-colloidal particles of a water-insoluble caseinate of a metal of the group consisting of copper, iron and manganese the individual particles of which are encapsulated within adsorbed coatings of a water-insoluble assimilable protein, heating the resulting admixture, out of access to air, to a temperature near the normal boiling point, canning the heated admixture out of access to air, and sterilizing the canned product.

4. The process of producing an evaporated milk product fortified with at least one of the metals of the group consisting of copper, iron and manganese and containing ascorbic acid, which comprises concentrating whole milk, admixing with the cooled concentrated milk a dispersion, in casein suspension, of near-colloidal particles of water-insoluble caseinates of at least one of the metals of the group consisting of copper, iron, and manganese the individual particles of which are encapsulated within adsorbed coatings of casein, standardizing the ascorbic acid content of the resulting admixture, heating the admixture, out of access to air, to a temperature near the normal boiling point, canning the heated admixture out of access to air, and sterilizing the canned product to the point at which clumping of the colloidal particles begins.

5. Evaporated milk, packaged in sealed containers and characterized by the presence of at least one of the metals of the group consisting of copper, iron, and manganese in the form of near-colloidal particles of a caseinate of the metal, said particles being encapsulated in a proteinous colloidal structure and present in the milk in sufficient quantity to prevent nutritional anemia, said evaporated milk product being further characterized by a content of ascorbic acid at least substantially equivalent to that present in the original starting material.

6. An evaporated milk product containing a stable suspension of colloidal particles, the colloidal particles containing a metallic constituent of the group consisting of copper, iron, and manganese in the form of a water-insoluble caseinate thereof and combined in a proteinous colloidal structure incapable of chemical action with the other constituents of the milk.

7. As a new product, evaporated, canned and sterilized milk containing a dietary sufficiency of assimilable, protein-encapsulated near-colloidal particles of caseinates of metals from the group consisting of iron, copper and manganese, said particles being stably suspended in the milk and said caseinates being chemically inactive while suspended in the milk but capable of being rendered active upon association with dilute hydrochloric acid.

GEORGE E. GRINDROD.

REFERENCES CITED

The following references are of record in the file of this patent:

UNITED STATES PATENTS

| Number | Name | Date |
| --- | --- | --- |
| 1,824,018 | Horn | Sept. 22, 1931 |
| 2,103,153 | Dunham | Dec. 21, 1937 |
| 2,310,383 | Andrews et al. | Feb. 9, 1943 |
| 2,359,413 | Freedman | Oct. 3, 1944 |

Patented Sept. 6, 1949

2,481,457

UNITED STATES PATENT OFFICE 2,481,457

GALVANIZING FLUX COMPOSITIONS AND PROCESSES

Charles A. Vana, Brecksville, Ohio, assignor to E. I. du Pont de Nemours & Company, Wilmington, Del., a corporation of Delaware No Drawing. Application February 3, 1945, Serial No. 576,162

6 Claims. (Cl. 148—23)

This invention relates to galvanizing fluxes and processes and more particularly to novel foaming fluxes having excellent fluidity and comprising a chloride, selected from the group consisting of ammonium chloride and zinc ammonium chloride, and an condensation product of formaldehyde corresponding to the formula

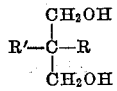

in which R and R' represent hydrogen, alkyl, amino, dimethylolacetyl, alpha - dimethylol - propionyl, or methylol groups, and is further particularly directed to galvanizing processes employing such fluxes.

In galvanizing practice it is customary to add a small amount of an organic material to the ammonium chloride or zinc ammonium chloride flux to produce a frothy layer on the surface of the molten metal in the galvanizing pot. A flux which in use forms such a frothy layer is known as a foaming flux. Organic materials commonly used to cause foaming are bran, glycerol, tallow, or sawdust. Inclusion of a foaming agent in a flux is ordinarily considered desirable because it retards decomposition of the flux, preheats incoming articles, and reduces spattering of molten metal.

Unfortunately, the foaming agents hitherto widely used have the disadvantage that after a period of use they thicken the flux and cause it to become viscous. This loss in fluidity is objectionable for a number of reasons. It retards the rate of wetting of the incoming work by the flux, which often results in failure to obtain complete coverage of the work and leads to imperfect galvanizing. It increases the rate at which flux is carried out on the finished work and complicates subsequent cleaning. It makes proper handling of the flux much more difficult. These and other objections to a viscous flux have caused some galvanizers in certain situations to prefer a non-foaming flux, despite the known advantages of foaming fluxes.

According to the present invention it has been found that by adding certain condensation products to ammonium chloride or zinc ammonium chloride there are produced galvanizing fluxes which are of the foaming type but which remain remarkably fluid during use. The condensation products effective to produce this result are condensation products of formaldehyde corresponding to the formula

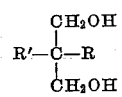

in which R and R' represent hydrogen, alkyl, amino, dimethylolacetyl, alpha-dimethylol-propionyl, or methylol groups. A further aspect of the invention consists of galvanizing processes employing such fluxes. The processes enjoy the advantages attending the use of a foaming flux but are not subject to the disadvantages heretofore ordinarily encountered. Moreover, by the use of a prepared flux composition of this invention the necessity for the galvanizer to determine the quantity of foamer to use is avoided.

To make a flux of this invention there is added to a major proportion of ammonium chloride or zinc ammonium chloride a minor proportion of a condensation product as a foamer. If too large a proportion of the foaming agent is used the flux will foam excessively and be difficult to use, while if the proportion is too small the advantages of the invention will not be fully realized. It has been found that the foaming agents herein described are extremely effective and it is preferred to employ about from 0.1 to 1.0 per cent by weight based on the ammonium chloride or zinc ammonium chloride.

The foamer may be added to the molten ammonium chloride or zinc ammonium chloride fluxing agent on the molten metal in the galvanizing pot. However, this involves the problem of distribution; that is, time and attention is required to insure a uniform distribution of the foamer throughout the fluxing agent. It is therefore preferred to incorporate the foamer in the fluxing agent prior to adding the flux to the galvanizing pot. This may be done by adding the foamer to the granular ammonium chloride or zinc ammonium chloride with mechanical agitation as, for instance, in a tumble mill. The products so produced are fluxes of maximum economy which can be used in the galvanizing plant with assurance of uniformity and without the close supervision attending the proportioning of the ingredients at the point of use.

The compounds employed as foamers in the fluxing compositions of this invention are either available commercially, for instance, pentaerythritol, or may easily be prepared by the condensation of formaldehyde with a suitable agent according to practices with which the art is already familiar.

In the following table are shown several examples of compounds which have been found to be effective as foamers in the fluxes of this invention, together with their structural formulae, their method of preparation, and the concentration of the agent, by weight, required in a zinc ammonium chloride flux to give a froth on a galvanizing bath during use equivalent to the froth produced by 0.75% glycerol, a foamer heretofore commonly used.

group and R represents a methylol group. In the case of 1-1, 3-3 tetramethylol 2-propanone, R' represents hydrogen and R represents an alkyl group.

The practice of this invention will be better understood by reference to the following illustrative example:

*Example*

Into the flux compartment of a job galvanizing pot, on the surface of the molten zinc, there was placed a quantity of a flux of this invention sufficient to produce a frothy layer about 15 inches deep. The flux used consisted of zinc ammonium chloride containing 0.37% of its weight of pentaerythritol. Initially the molten flux layer had a viscosity of about 40 centipoises.

| Compound | Per Cent Conc. | Formula | Condensation Product of HCHO with: |
|---|---|---|---|
| Pentaerythritol | 0.37 | HOCH₂—C(CH₂OH)(CH₂OH)—CH₂OH | Acetaldehyde. |
| Ethyl Trimethylol Methane | 0.55 | C₂H₅—C(CH₂OH)(CH₂OH)—CH₂OH | Butyraldehyde. |
| Methyl Trimethylol Methane | 0.66 | CH₃—C(CH₂OH)(CH₂OH)—CH₂OH | Propionaldehyde. |
| Trimethylol Amino Methane | 0.44 | HOCH₂—C(CH₂OH)(CH₂OH)—NH₂ | Nitromethane. |
| 2-Amino-2-Methyl 1,3 Propanediol | 0.76 | HOCH₂—C(CH₃)(NH₂)—CH₂OH | Nitroethane. |
| 1-1,3-3 Tetramethylol 2-propanone | 0.48 | HOCH₂—CH(CH₂OH)—CO—CH(CH₂OH)—H (H—C(HOCH₂)(CH₂OH)—C(=O)—C(HOCH₂)(CH₂OH)—H) | Acetone. |
| 2-Amino-2-Ethyl 1,3 propanediol | 0.67 | HOCH₂—C(C₂H₅)(NH₂)—CH₂OH | Nitroethane. |
| 1-1,3-3-Tetramethylol 2-butanone | 0.48 | H₃C—C(HOCH₂)(CH₂OH)—C(=O)—C(HOCH₂)(CH₂OH)—H | Methyl ethyl ketone. |
| 2-2,4-4-Tetra-Methylol 3-Pentanone | 0.55 | H₃C—C(HOCH₂)(CH₂OH)—C(=O)—C(HOCH₂)(CH₂OH)—CH₃ | Diethyl ketone. |
| 1-1,3-3 Tetramethylol 2-heptanone | 0.70 | H—C(HOCH₂)(CH₂OH)—C(=O)—C(HOCH₂)(CH₂OH)—(CH₂)₃CH₃ | Methyl amyl ketone. |

The foregoing compounds are all condensation products of formaldehyde and correspond to the formula

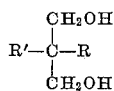

$$R'-\underset{\underset{CH_2OH}{|}}{\overset{\overset{CH_2OH}{|}}{C}}-R$$

in which R and R' represent hydrogen, alkyl, amino, dimethylolacetyl, alpha-dimethylol-propionyl, or methylol groups. In the case of pentaerythritol, for instance, R and R' both represent methylol groups. In the case of ethyl trimethylol methane, R' represents an aliphatic The galvanizing pot and flux bath were then used for galvanizing a quantity of iron pipe, the pipe being introduced into the molten zinc by passing through the frothing flux, then being passed beneath a dam holding back the flux, and being removed from the pot without again passing through the flux. During the operation additional flux was added as required to maintain the flux layer at its original depth. At the end of eight hours of such operation the viscosity of the flux had risen to 200 centipoises but the flux was still sufficiently fluid to be effective, that is, it was still a "live" flux.